US011977364B2

(12) United States Patent
Zimmermann et al.

(10) Patent No.: US 11,977,364 B2
(45) Date of Patent: May 7, 2024

(54) MODERNIZATION METHOD OF AN EXISTING PASSENGER TRANSPORT SYSTEM

(71) Applicant: INVENTIO AG, Hergiswil (CH)

(72) Inventors: Gilbert Zimmermann, Stansstad (CH); Thomas Novacek, Schwechat (AT)

(73) Assignee: INVENTIO AG, Hergiswil (CH)

( * ) Notice: Subject to any disclaimer, the term of this patent is extended or adjusted under 35 U.S.C. 154(b) by 620 days.

(21) Appl. No.: 17/250,715

(22) PCT Filed: Aug. 20, 2019

(86) PCT No.: PCT/EP2019/072215
§ 371 (c)(1),
(2) Date: Feb. 23, 2021

(87) PCT Pub. No.: WO2020/038915
PCT Pub. Date: Feb. 27, 2020

(65) Prior Publication Data
US 2021/0173380 A1 Jun. 10, 2021

(30) Foreign Application Priority Data
Aug. 24, 2018 (EP) .................... 18190616

(51) Int. Cl.
*B66B 23/00* (2006.01)
*B33Y 50/00* (2015.01)
(Continued)

(52) U.S. Cl.
CPC .......... *G05B 19/4099* (2013.01); *B33Y 50/00* (2014.12); *B33Y 80/00* (2014.12);
(Continued)

(58) Field of Classification Search
CPC ...... G05B 19/4099; G05B 2219/35134; G05B 2219/49023; B33Y 50/00; B33Y 80/00; B66B 23/00; B66B 21/00; G06T 17/00
See application file for complete search history.

(56) References Cited

U.S. PATENT DOCUMENTS 6,685,002 B1 * 2/2004 Nurnberg ................ B66B 23/00
198/321
6,912,489 B1 6/2005 Luitwieler
(Continued)

FOREIGN PATENT DOCUMENTS

| CN | 101802825 A | 8/2010 | |
| CN | 101873985 A * | 10/2010 | ............... B66B 1/18 |

(Continued)

OTHER PUBLICATIONS

International Search Report for International Application No. PCT/EP2019/072215 dated Dec. 6, 2019.

*Primary Examiner* — Kandasamy Thangavelu
(74) *Attorney, Agent, or Firm* — Knobbe Martens Olson & Bear LLP

(57) ABSTRACT

A modernization method of an existing passenger transport system which is designed as an escalator or a moving walkway is disclosed. In the process, the modernization method can include generating a three-dimensional supporting framework model data set of the existing supporting framework, integrating the same into a digital double data set, producing the required components on the basis of the digital double data set, and installing said components into the existing framework.

17 Claims, 4 Drawing Sheets

(51) Int. Cl.
*B33Y 80/00* (2015.01)
*G05B 19/4099* (2006.01)
*G06T 17/00* (2006.01)

(52) U.S. Cl.
CPC .............. *B66B 23/00* (2013.01); *G06T 17/00* (2013.01); *G05B 2219/35134* (2013.01); *G05B 2219/49023* (2013.01)

(56) References Cited

U.S. PATENT DOCUMENTS

2015/0154324 A1 6/2015 Reilio et al.
2019/0322492 A1 10/2019 Eder et al.

FOREIGN PATENT DOCUMENTS

| | | | | |
|---|---|---|---|---|
| CN | 104661944 A | 5/2015 | | |
| CN | 106315319 A | 1/2017 | | |
| CN | 109415188 A | 3/2019 | | |
| EP | 1464605 A1 | * 10/2004 | ........... | B66B 5/0025 |
| EP | 3081522 A1 | * 10/2016 | ............ | B66B 23/14 |
| EP | 2900585 B1 | * 11/2016 | ............ | B66B 21/10 |
| WO | WO 2004/035452 A1 | 4/2004 | | |
| WO | WO 2013182232 A1 | 12/2013 | | |
| WO | WO 2017220650 A1 | 12/2017 | | |

\* cited by examiner

MODERNIZATION METHOD OF AN EXISTING PASSENGER TRANSPORT SYSTEM

TECHNICAL FIELD

The disclosure relates to a modernization method of an existing passenger transport system which is configured as an escalator or a moving walkway and which has a circulating conveyor belt.

SUMMARY

Passenger transport systems in the form of escalators or moving walkways are mostly used within buildings to be able to transport passengers between two specified locations. In escalators, which are sometimes also referred to as moving walks, the two locations are on different levels and passengers are transported along a steeply inclined conveyor path, whereas in the case of moving walkways, the two locations are on the same level or only slightly different levels and the passengers are transported at ground level or along a conveying path that is only slightly inclined. In the following, escalators and moving walkways are summarized under the more general term passenger transport systems.

The passenger transport system generally has a circumferentially arranged conveyor belt with a plurality of step units that can be displaced along a circumferential travel path. The step units are accessible from the outside at least within a so-called conveying region, so that passengers, for example, coming from an entry region can step onto one of the step units in the conveying region, then be conveyed along the conveyor path, and finally can get off again at an exit region at the opposite end. The conveying region is sometimes also referred to as the forward region of the passenger transport system, with the circulating conveyor belt running back in a return region below the forward region and of course not being able to be entered by passengers. In the case of escalators, the step units are usually referred to as treads; in the case of moving walkways, the step units are usually referred to as pallets. The step units are generally arranged one behind the other along the travel path and are each fastened to at least one conveyor chain or a belt in order to form the conveyor belt in this way. As standard, the passenger transport system also has balustrades with circumferential handrails that line the conveyor belt along the length. Users can hold on to these.

In addition to the conveyor belt, the passenger transportation system has a supporting framework, with the aid of which the passenger transport system can be fastened within the building and through which the weight of the passenger transportation system is supported on the building. The supporting framework is usually designed as a framework. Such a framework is composed of a large number of structural components. Such structural components can be, inter alia, cross struts, longitudinal struts, diagonal struts, adapter components, and the like. The supporting framework is designed and arranged in such a way that it can be mounted on the one hand on the supporting frameworks of the building and on the other hand other components of the passenger transport system, in particular guide components of the conveyor belt, the conveyor belt, the balustrades, the handrails, drive components for driving the conveyor belt and the handrails, and control components for controlling the drive components and the like can be mounted in and on the supporting framework. A geometric and structural design of the load-bearing structure of the passenger transport system formed by the supporting framework should therefore take into account both geometric and structural boundary conditions within the receiving building as well as corresponding conditions of other components of the passenger transport system.

After a period of operation, it may be necessary to modernize a passenger transport system. In the process, for example, worn components of the passenger transport system can be replaced. Alternatively or additionally, components of the passenger transport system can be replaced by corresponding components which are more modern in order, for example, to improve the performance, comfort, and/or durability of the original passenger transport system.

As an alternative to modernizing an existing passenger transport system, the passenger transport system could also be replaced as a whole. It can be more cost-effective to manufacture a replacement passenger transport system in a standardized manner in a factory instead of modernizing an existing passenger transport system. However, additional effort and costs can arise in order to transport the replacement passenger transport system to its place of use. In particular, it can involve considerable effort to install a replacement passenger transport system as a very large component in an existing building, since walls of the building and/or other obstacles often have to be at least partially removed.

As part of a modernization of a passenger transportation system, an existing supporting framework of the passenger transport system is typically first cleared, e.g., by removing components of the passenger transportation system that are to be modernized. In other words, some or all components of the passenger transport system other than the supporting framework can be removed. The remaining supporting framework of the passenger transport system is then prepared for receiving new components, e.g., cleaned and provided with suitable adapter plates or adapter modules, so that new components can then be mounted on the supporting framework.

WO 2004/035452 A1 describes a method for modernizing an existing escalator. WO 2017/220650 A1 also describes a method for modernizing an existing escalator or an existing moving walkway.

Conventionally, when modernizing an existing passenger transport system after removing components to be replaced, the remaining supporting framework is first precisely measured so that it can later be adapted to replacement components to be accommodated using adapter plates and adapter modules, for example. Such a measurement is conventionally carried out by specialized personnel who, for example, know exactly the replacement components and their installation requirements, as well as which dimensions of the remaining or existing supporting framework have to be measured in order to later fit the replacement components as well as any design or adaptation to be able to prepare adapter components with sufficient accuracy. Such a measurement of the supporting framework and subsequent construction of adapter components was both expensive and time-consuming due to the required expertise of the specialist staff and the need for the specialist staff to inspect and measure the passenger transport system on site.

Among other things, there may be a need for a modernization method which considerably simplifies the modernization of an escalator or a moving walkway and requires less personnel and/or financial expenditure. In particular, there may be a need for a modernization method by means of which the structural components of the supporting framework of the existing passenger transport system can be measured without qualified personnel having to measure the passenger transport system on site.

A requirement of this kind can be met by a modernization method as described herein.

Advantageous embodiments are provided throughout the following description and in the appended claims.

According to a first aspect of the disclosure, a modernization method of an existing passenger transport system, which is configured as an escalator or moving walkway and therefore comprises a traveling conveyor belt, is proposed. In some embodiments, the modernization method according to the disclosure includes one or more of the method steps listed below, although these do not necessarily have to be processed in the order listed.

In one of the method steps, a three-dimensional supporting framework model data set is generated from the existing supporting framework of the existing passenger transport system. In principle, within the meaning of the present disclosure, a model data set of a component comprises characterizing features that reproduce as much as possible all forms of the described component. Characterizing features can include the geometric data (length, width, height, cross-sectional shape, recesses, protrusions, radii, arc dimensions, etc.), the surface properties (roughness, texture, color, etc.), the material properties (chemical composition, density, modulus of elasticity, bending fatigue strength, tensile and compressive strength, etc.) and the like. This can mean that for the three-dimensional supporting framework model data set of the existing supporting framework, as much geometric data as possible has to be detected in digitized form and stored as characterizing features. In addition, further data on the material properties of the existing supporting framework are preferably determined and stored as characterizing features in its three-dimensional supporting framework model data set. If necessary, a three-dimensional supporting framework model data set of the existing structural framework is already available or at least partially available, so that the actual generation is limited to an addition with further data or a conversion into a usable data format. In most cases, however, there is no such three-dimensional supporting framework model data set, as the existing supporting framework was manufactured decades ago using conventional, two-dimensional drawings. The detection of the geometric data of such a supporting framework is described in more detail below.

In a further method step, the core space of the existing supporting framework is determined based on the three-dimensional supporting framework model data set.

Supporting frameworks of escalators and moving walkways from all manufacturers can be configured very differently. However, many have a U-shaped cross section in relation to their longitudinal extension, in that two side structures are connected to one another by a floor or a bottom structure. In other words, the existing supporting framework or its three-dimensional supporting framework model data set has two side structures that are connected to one another by means of a bottom structure. The above-mentioned core space is defined by the insides of the side structures and the bottom structure and is usually open towards the top due to the installation position of the supporting framework.

Furthermore, in a further method step, customer-specific configuration data relating to the new components to be installed are determined. In the process, the customer can choose the desired options from various options. Such options can relate in particular to the appearance, but of course desired performance data of the passenger transport system or additional safety equipment such as sensors and the like can also be selected. Preferably, only configurations are made possible whose conveyor belt can be arranged within the core space. In addition to the installation-specific parameters such as the distance between the two access regions and the conveying height of the existing escalator or moving walkway, the width of the core space of the existing supporting framework or the new conveyor belt intended for installation are the limiting characterizing features.

In a further method step, a digital double data set of a complete passenger transport system is created using the customer-specific configuration data from component model data sets. This can mean that for each individual component of an escalator or moving walkway, a component model data set can be called up from a storage medium, which defines the component in a target configuration using characterizing features. In addition to the characterizing features already mentioned above, the component model data sets also have interface features to adjacent component model data sets. The interface features are, on the one hand, spatial coordinates in three-dimensional space at which further components are positioned based on their interface features. On the other hand, the interface features can also have link information that defines which component model data set or which selection of other component model data sets is actually permissible to be linked to this interface. Furthermore, the interface features preferably reflect the geometric configuration of this interface, for example, the diameter, the depth, and the spatial orientation of a screw hole.

In other words, there can be a virtual, three-dimensional model of every screw, guide rail, every step element, etc., to be used. The entirety of these virtual, three-dimensional models defined from the customer-specific configuration data results—combined using the interface features—in a three-dimensional, virtual model of a complete passenger transport system, and thus in the aforementioned digital double data set. The data for the digital double data set can be present, for example, as a CAD data set which, inter alia, reproduces geometric dimensions and/or other characterizing properties of the components forming the passenger transport system as characterizing properties.

The central component model data set of this digital double data set is the component model data set of the supporting framework, which is designed solely on the basis of the customer-specific configuration data and which is actually not needed. However, it has most of the interface features to adjoining component model data sets as well as the spatial distances between these interface features. As explained further below, this component model data set can be required to compare the three-dimensional supporting framework model data set of the existing supporting framework and is therefore referred to below as a provisional supporting framework model data set.

As already mentioned, the new components to be inserted for the purpose of modernization or their component model data sets are selected and designed on the basis of the customer-specific configuration data and in particular the determined core space. In the process, however, any contours of components of the existing supporting framework that protrude into the core space or penetrate it are not taken into account. So that these contours do not hinder the installation and function of the new components to be inserted, in a further method step, contours of the three-dimensional supporting framework model data set of the existing supporting framework protruding or penetrating into the core space are marked as to be removed. Their physical counterparts will be removed later when the existing supporting framework is being prepared. Examples of such contours are cross struts which support the two side structures of the supporting framework against one another or frames arranged on the side structures which serve to support and fasten guide rails.

In a further method step, the three-dimensional supporting framework model data set of the existing supporting framework is adapted in regard of the provisional supporting framework model data set of the digital double data set. In the process, the interface features of the provisional supporting framework model data set can be copied to the three-dimensional supporting framework model data set of the existing supporting framework. For example, the interface features of the provisional supporting framework model data set, which can be imagined as position points in space, are transmitted, aligned over the spatial positions of the central longitudinal axes of the two component model data sets and the horizontal planes of the access regions in the installation position, to the three-dimensional supporting framework model data set of the existing supporting framework. The component model data sets of adapter components can then be generated taking into consideration the interface features of the provisional structural model data set of the digital double data set, and the geometric data of the three-dimensional supporting framework model data set of the existing supporting structure while disregarding its marked contours.

There are various options for creating a three-dimensional supporting framework model data set from the existing supporting framework. The most complex is a manual measurement of the existing supporting framework after all other existing parts of the passenger transport system have been removed. The measurement data can then be transmitted to a 3D CAD system, for example. In the process, however, there is a risk that measurement errors and/or transmission errors can creep in. The use of laser scanners or TOF cameras, which can capture a three-dimensional, virtual copy of the existing supporting framework, is much safer, more precise, and faster. In the process, however, recordings have to be made from a plurality of positions around the framework and these have to be put together, wherein recording-related distortions have to be corrected. After processing and assembling the recordings, the resulting three-dimensional copy can be read into a computer system and converted into a three-dimensional component model data set of the existing supporting framework using known software algorithms (e.g., tracing). Both methods have the disadvantage that the existing supporting framework has to be exposed and therefore the existing passenger transport system is no longer available from this point in time.

This disadvantage can be overcome if the three-dimensional supporting framework model data set of the existing supporting framework is generated in that:
- an image recording device is fixed to the existing, circulating conveyor belt;
- at least one step unit of the circulating conveyor belt is removed in order to open up visual access to the underlying regions of the existing supporting framework;
- before recording image recordings, at least one reference mark which is clearly recognizable for the image recording device is attached to the existing passenger transport system in a stationary manner at least one point within the travel path of the step units;
- the conveyor belt, together with the image recording device fixed thereon, is displaced circumferentially at least over sub-regions of the travel path;
- image recordings of the structural components to be measured are using of the image recording device from a plurality of positions along the travel path; and
- the generation of the three-dimensional supporting framework model data set takes place at least from sub-regions of the structural components of the existing supporting framework, based on the recorded image recordings and with the aid of the at least one reference mark recorded.

After the necessary image recordings have been taken and processed accordingly, the step unit can be reinserted into the existing conveyor belt and the existing passenger transport system can continue to be operated until the modernization is carried out.

As already mentioned, before the image recordings are recorded, a reference mark that is clearly recognizable for the image recording device is fixedly attached to the passenger transport system at a point within the travel path, or a plurality of reference marks that are clearly recognizable for the image recording device are fixedly attached to the passenger transport system at various points along the travel path.

In other words, the existing passenger transport system can be suitably prepared by attaching one or more reference marks before the image recordings of its supporting framework are started, in order to subsequently be able to generate the three-dimensional supporting framework model data set more easily and/or more precisely from the recorded image recordings and/or to be able to evaluate it better. When generating the three-dimensional supporting framework model data set, the reference marks can then be used, for example, as an orientation, to form a scale, or the like.

Self-adhesive markers or markers that are easy to fasten can be used as reference marks. The reference marks can be provided with patterns, barcodes, or the like. The patterns or barcodes can be designed differently for the various reference marks so that they can be distinguished from one another. The reference marks can also be designed as centering marks, e.g., similar to a target, for example.

The reference marks can be attached at predetermined positions along the passenger transport system. Alternatively, reference marks can be attached to any position on the passenger transport system. In particular, the reference marks can be attached to parts of the balustrade and/or the structural components of the existing supporting framework to be measured and detected. Positions of the reference marks relative to one another can optionally be measured precisely. In some embodiments of the process, it can only depend on the positions or distances of the reference marks relative to one another; an absolute positioning of the reference marks on the passenger transport system can be of little or no relevance.

According to one embodiment of the disclosure, when generating the three-dimensional supporting framework model data set, a plurality of image recordings are combined to form an overall recording, taking into consideration reference marks recorded together in the image recordings.

In other words, the reference marks previously attached to the passenger transport system can be used to be able to subsequently combine a plurality of individually recorded image recordings to form an overall recording in order to then be able to generate the 3D model from them. This 3D model can then be stored as the starting point for the three-dimensional supporting framework model data set.

The starting point is because the dimensions extracted from the image recordings are already characterizing properties of the three-dimensional supporting framework model data set, but as mentioned below, they may still have to be processed or further characterizing properties such as information on the material properties must be added in order to become a sufficiently defined, three-dimensional supporting framework model data set.

It can be advantageous to arrange the reference marks on the passenger transport system along the travel path and/or record image recordings along the travel path at suitable positions in such a way that at least one, and preferably at least two, reference marks are also recorded in each image recording. In particular, if the reference marks are each designed differently and are thus distinguishable from one another, the reference marks recorded in the image recordings can be used to clearly determine the position at which an image recording was recorded and how this can be combined with other image recordings.

According to one embodiment of the disclosure, when generating the three-dimensional supporting framework model data set, distortions in the image recordings can be corrected using reference marks recorded in the image recordings.

Similarly to the embodiment described above, the reference marks can thus again be used in order to be able to generate the three-dimensional supporting framework model data set. By taking into consideration the reference marks attached at previously known positions and/or at known distances from one another, it can be recognized whether there has been distortions in the image recordings, for example, caused by optical errors in the image recording device. In particular, it can be important to be able to draw conclusions from the recorded image recordings about the actual dimensions and geometries of the recorded structural components of the existing supporting framework and to be able to differentiate between virtual recording errors in the form of distortions and real geometries of the structural components. For example, the structural components of the existing supporting framework, which are initially mostly designed in the form of straight struts or spars, can deform or bend over time. Curved structural components can then be seen in the recorded image recordings. However, the structural components can still be straight and only appear curved due to optical distortions in the image recordings. With the help of the previously attached reference marks, the virtual distortions can be distinguished from real curvatures. Such distortions can then be calculated out in a suitable manner and thus the accuracy or scale accuracy of the characterizing properties of the three-dimensional supporting framework model data set can be improved.

As a further possible embodiment of the disclosure, the characterizing properties of the three-dimensional supporting framework model data set can be calibrated on the basis of reference marks recorded in the image recordings.

In other words, the reference marks attached to previously known or precisely measured positions can be used to calibrate the generated 3D model of the three-dimensional supporting framework model data set. In a 3D model calibrated in this way, the position and dimensions of structural components or distances between structural components are reproduced true to scale, so that such dimensions or distances can be measured precisely with the aid of the three-dimensional supporting framework model data set.

According to one embodiment, the image recordings can be recorded during the continuous displacement of the existing conveyor belt.

In other words, the conveyor belt can be continuously revolving in such a way that the image recording device fixed to it is continuously moved, for example, from one extreme position to a second extreme position, for example, from one access region to the other access region of the existing passenger transport system. On the travel path between the two extreme positions, the image recording device can then record a plurality of image recordings from different positions. The conveyor belt does not necessarily have to be stopped for this purpose, so that a travel time can be kept short and/or control of the drive of the conveyor belt can be kept simple.

Alternatively, according to one embodiment, the movement of the conveyor belt can be temporarily interrupted while the image recordings are being detected.

In other words, the image recording device can indeed be displaced again by the conveyor belt from one extreme position to a second extreme position. In this case, however, the displacement process is briefly interrupted one or more times, e.g., the conveyor belt is briefly stopped so that the image recording device can record the image recordings during a standstill. The quality of the image recordings can generally be improved as a result, since, for example, there is no blurring due to jerking or shaking of the image recording device.

According to one embodiment, the image recording device can exchange signals with a control unit of the existing passenger transport system in order to coordinate the recording of the image recordings with the displacement of the conveyor belt.

In other words, the image recording device and the control unit of the passenger transport system can be in communication in such a way that the image recording device can record coordinated image recordings, for example, depending on a current displacement state of the conveyor belt. For example, based on the signals received from the control unit of the passenger transport system, the image recording device can recognize when it has reached a specific position, and can then record an image from this position. As an alternative or in addition, the image recording device can use signal transmission to cause the control unit of the existing passenger transport system to stop briefly in order to be able to record an image. The image recording device and the control unit of the existing passenger transport system can communicate with one another in different ways, for example, via a cable connection to be set up beforehand or, alternatively, for example, via a wireless radio link.

According to one embodiment, the image recording device can be set up to recognize an end of the conveying region and then to signal the control unit of the existing passenger transport system to end the displacement of the conveyor belt.

In other words, the image recording device can, for example, use the image recordings recorded by it to recognize when it is approaching an end of the conveying region. The image recording device in communication with the control unit of the passenger transport system can then instruct the control unit to stop the conveyor belt.

The image recording process can thus be started by a person as soon as the image recording device is correctly fixed on the conveyor belt and, at the same time or subsequently, the control unit of the existing passenger transport system can be triggered accordingly in order to convey the image recording device along the travel path. If, for example, the image recording device reaches or approaches an opposite end of the travel path or the conveying region, the image recording device can communicate this independently to the control unit of the passenger transport system and instruct it to stop the conveying process. The image recording device can then be removed from the conveyor belt again. This can simplify the entire method. In particular, damage to the image recording device due to collision with parts of the passenger transport system can be avoided.

In a further embodiment of the disclosure, in the case of the digital double data set, the provisional structural model data set generated from the customer-specific configuration data is replaced by the three-dimensional supporting framework model data set of the existing supporting framework. Of course, when replacing, all spatial positions of the remaining component model data sets of the digital double data set to one another, or their spatial arrangement to one another, are retained. Likewise, specific spatial position information of the provisional supporting framework model data set, such as its central longitudinal axis and the horizontal planes of its access regions, can be retained in order to align the three-dimensional supporting framework model data set of the existing supporting framework to be inserted. Furthermore, the interface features of the provisional supporting framework model data set must be transmitted to the three-dimensional supporting framework model data set of the existing supporting framework by means of adapter parts.

In the process, the adapter components fulfill the function of being a link between the existing supporting framework and the components to be newly inserted into this structure, these newly inserted components being combined as component model data sets in the digital double data set, selected on the basis of the customer-specific configuration data. In other words, this can mean that all interface features of the provisional supporting framework model data set must be made available through component model data sets of adapter components on the three-dimensional supporting framework model data set of the existing supporting framework, and afterwards in physical form through adapter components on the existing supporting framework. After removing the provisional supporting framework model data set, the three-dimensional supporting framework model data set of the existing supporting framework, which has been reduced by the marked contours, and the component model data sets of the adapter components can be inserted into the digital double data set.

To generate the component model data sets of adapter components, a set of rules (generative function-driven design) can be available by means of which a logical selection and grouping of interface features of the component model data sets to be attached to the three-dimensional supporting framework model data set of the existing supporting framework of the digital double data set can be made for each component model data set of an adapter component. The logical selection can be based, for example, on criteria such as the weight of the adapter component to be produced, its production, its handling, and the like.

The set of rules can also contain an algorithm that selects geometric data of contours of the three-dimensional supporting framework model data set of the existing structural framework, which are arranged near the selected interface features of the adapter component, and determines the maximum forces acting on the selected interface features. In the process, a maximum approach is preferably selected, e.g., the maximum expected forces that can be retrieved from the digital double data set as interface features and stored as characterizing properties in the individual component model data sets are used as the basis for calculation.

In order to achieve a function-driven design of the adapter component in a further embodiment, the component model data set of the adapter component can be generated using the selected geometric data, the geometric data of the component model data sets, which have the selected interface features, and the forces acting on these interface features. In the process, the selected, geometric data of the component model data sets to be connected to one another predetermine specific expansion limits of the adapter component. The component model data set of the adapter component is preferably generated taking into consideration optimization criteria to be selected by means of an optimization algorithm. This can be done, for example, on the basis of the known Monte Carlo simulation.

In other words, the adapter components can be configured in a topology-optimized manner based on their function, their installation conditions, as well as forces and loads acting on them and subsequently also produced for the respective passenger transport system to be modernized. This results in considerable advantages for the consumption of resources, since only the absolutely necessary amount of material is used (e.g., steel, aluminum) or new, resource-saving production techniques can be used, whereby the $CO^2$ footprint of the modernized passenger transport system decreases even further, since by maintaining the existing supporting framework and by adapting it with adapter components to save resources, less material has to be recycled in a costly manner.

Since the success of a modernization of a passenger transport system generally always includes a time-critical component, at least one component model data set of an adapter component provided with production-specific data can be transmitted to a 3D printing machine, and a physical adapter component can be generated by means of this component model data set. This can mean that these very special individual items can be produced in a resource-saving manner and are available "overnight," so to speak.

As already mentioned, not only geometric data are required in order to manufacture a corresponding, physical component using a component model data set. The modernization method according to the disclosure therefore provides for a commissioning digital double data set to be created from the digital double data set, by supplementing the digital double data set and its component model data sets with production-specific data, and this commissioning digital double data set comprises target data which reproduce characterizing features of components of the passenger transport system in a target configuration.

In other words, taking into consideration the customer-specific configuration data from component model data sets as well as the three-dimensional supporting framework model data set of the existing supporting framework and the generated component model data sets of the adapter components, a digital double data set is created and then this digital double data set is modified or refined to the commissioning digital double data set, taking into consideration the production-specific data. Creating the commissioning digital double data set can also possibly include numerous iterative calculations and modifications to data from the digital double data set, taking into consideration customer and/or production-specific data.

The production-specific data typically relate to properties or specifications within a manufacturing plant or production line in which the passenger transport system is to be manufactured. For example, depending on the country or location in which a production factory is located, various conditions may exist in the production factory and/or various requirements may have to be met. For example, in some production factories specific materials, raw materials, raw components or the like may not be available or may not be processed. In some factories, machines can be used that are not available in other factories. Due to their layout, some factories are subject to restrictions with regard to the passenger transport systems or components thereof to be produced. Some production factories allow a high degree of automated production, whereas other production factories use manual production, for example, due to low labor costs. There may be a multitude of other conditions and/or requirements for which production environments can differ. All of these production-specific data typically have to be taken into account when planning or commissioning a passenger transport system, since these data may have a critical role in how a passenger transport system can actually be built. It may be necessary to fundamentally modify the initially created digital double data set, which only took into account the customer-specific configuration data and the existing supporting framework, in order to be able to take the production-specific data into consideration.

Static and/or dynamic simulations are preferably carried out when the digital double data set is created, and the commissioning digital double data set is created taking results of the simulations into account. One of these dynamic simulations can be, for example, a starting behavior for an escalator. In the process, all friction forces as well as clearances and the properties dependent on the driving engine are simulated, from standstill to nominal speed. With these simulations, points critical to collision can be checked and the dynamic forces acting on the individual components or component model data sets can be determined during the start-up. In particular, these simulations can also be used to simulate and check the static and dynamic properties of the existing supporting framework and, if necessary, to generate additional component model data sets from adapter components to reinforce its structure.

In other words, to create the digital double data set, which, taking into consideration the customer-specific configuration data, forms the basis of the commissioning digital double data set, simulations can be performed with which static and/or dynamic properties of the commissioned passenger transport system are simulated. Simulations can be performed in a computer system, for example.

In the process, static simulations analyze, for example, a static interaction of a plurality of assembled components. With the help of static simulations, it is possible to analyze, for example, whether complications can arise during assembly of a plurality of predefined components or components specified appropriately based on component model data sets, for example, because each of the components is manufactured with certain manufacturing tolerances so that there can be problems if the sum of manufacturing tolerances is unfavorable.

The aforementioned dynamic simulations when creating the digital double data set analyze, for example, the dynamic behavior of components during the operation of the assembled passenger transport system. By means of dynamic simulations, for example, it is possible to analyze, for example, whether moving components, in particular the traveling components arranged within a passenger transport system, can be moved in a desired manner or whether there is a risk of collisions between components moving relative to one another.

From the foregoing, it can be seen that initially only target data based on the data determined when planning and commissioning the passenger transport system are stored in the commissioning digital double data set. These target data can be obtained, inter alia, if, for example, computer-assisted commissioning tools are used to calculate the characterizing properties of a passenger transport system to be produced, depending on customer-specific configuration data. For example, data relating to target dimensions, target numbers, target material properties, target surface quality, etc. of components to be used in the modernization of the passenger transport system can be stored in the commissioning digital double data set.

The commissioning digital double data set record thus represents a virtual copy of the modernized passenger transport system in its planning phase or commissioning phase, e.g., before the passenger transport system is actually modernized on the basis of the commissioning digital double data set.

According to one embodiment of the present disclosure, the proposed modernization method also includes the creation of an updated digital double data set, which is referred to below as ADDD for reasons of better readability. The creation of the updated digital double data set comprises at least the following steps, but preferably not strictly in the order given:

(i) creating a production digital double data set based on the commissioning digital double data set by measuring actual data which reproduce characterizing properties of components of the modernized physical passenger transport system immediately after the assembly, and replacing target data in the commissioning digital double data set with corresponding actual data; and, (ii) creating the updated digital double data set based on the production digital double data set by modifying the production digital double data set during the operation of the modernized physical passenger transport system taking into consideration measured values, which reproduce changes in the characterizing features of components of the modernized physical passenger transport system during operation.

In other words, the updated digital double data set can be created in a plurality of sub-steps. Proceeding from the commissioning digital double data set, the target data contained therein can then be successively replaced by actual data as production and modernization progresses, and a production digital double data set can be generated. The actual data indicate characterizing properties of the components of the passenger transport system, initially only defined with regard to their target configuration, in their actual configuration. The actual data can be determined by manual and/or mechanical surveying of the characterizing properties of the components. Separate measuring apparatuses and/or sensors integrated in components or arranged on components can be used for this purpose. The data contained in the data set can be successively improved and refined so that the characterizing properties of the components installed in the modernized passenger transport system are reproduced more and more precisely with regard to their actual current configuration with continuous creation. A refinement is achieved in particular by the transmission of measured values, which allows the characterizing properties of the component model data sets affected by these measured values to be tracked and thus creates an extremely precise simulation environment for assessing current and future (damage) events. The measured values detected during operation preferably come from a sensor system installed in the modernized passenger transport system.

The updated digital double data set represents a very precise virtual copy of the modernized passenger transport system during the operation thereof, while taking into consideration, for example, wear-related changes in comparison to the characterizing properties originally measured immediately after completion, and it can thus be used as updated digital double data set for continuous or repeated monitoring of the properties of the passenger transport system.

However, it is not absolutely necessary for all of the characterizing properties of a component that are present as target data to be updated by actual data of the component or by the characterizing properties calculated on the basis of the load profile. As a result, the characterizing properties of most components of a production digital double data set and of the resultant updated digital double data set are characterized by a mixture of target data, actual data, and calculated data.

Concrete refinements of the modernization method are set out below with reference to preferred embodiments.

Embodiments of the modernization method of an existing passenger transport system presented in this case can be carried out with the aid of an apparatus specially configured for this purpose. The apparatus can comprise one or more computers. In particular, the apparatus can be formed from a computer network which processes data in the form of a data cloud. For this purpose, the apparatus can have a storage device in which the data of the three-dimensional supporting framework model data set, the component model data sets, the digital double data set, up to the updated digital double data set can be stored, for example, in electronic or magnetic form. The apparatus can also have data processing options. For example, the apparatus can have a processor which can be used to process the data in all these data sets. The apparatus can furthermore have interfaces via which data can be input into and/or output from the apparatus. The apparatus can also be implemented in a spatially distributed manner, for example, if data are processed in a data cloud and distributed over a plurality of computers.

In particular, the apparatus may be programmable, e.g., it may be prompted by a suitably programmed computer program product to execute or control computer-processable steps and data of the modernization method according to the disclosure. The computer program product may contain instructions or code which, for example, cause the processor of the apparatus to create, store, read, process, modify, etc., the digital double data set. The computer program product may be written in any computer language.

The computer program product can be stored on any computer-readable medium, for example, a flash storage device, CD, DVD, RAM, ROM, PROM, EPROM, etc. The computer program product and/or the data to be processed therewith can also be stored on a server or a plurality of servers, for example, in a data cloud, from where these data can be downloaded via a network, for example, the internet.

It should be noted that some of the possible features and advantages of the disclosure are described herein with reference to different embodiments. A person skilled in the art recognizes that the features can be combined, transferred, adapted, or replaced in a suitable manner in order to arrive at further embodiments of the disclosure.

BRIEF DESCRIPTION OF THE DRAWINGS

Embodiments of the disclosure will be described in the following with reference to the accompanying drawings, although neither the drawings nor the description should be construed as limiting the disclosure.

The figures are merely schematic and are not true to scale. Like reference signs designate like or equivalent features in the various figures.

DETAILED DESCRIPTION

Figure 1:
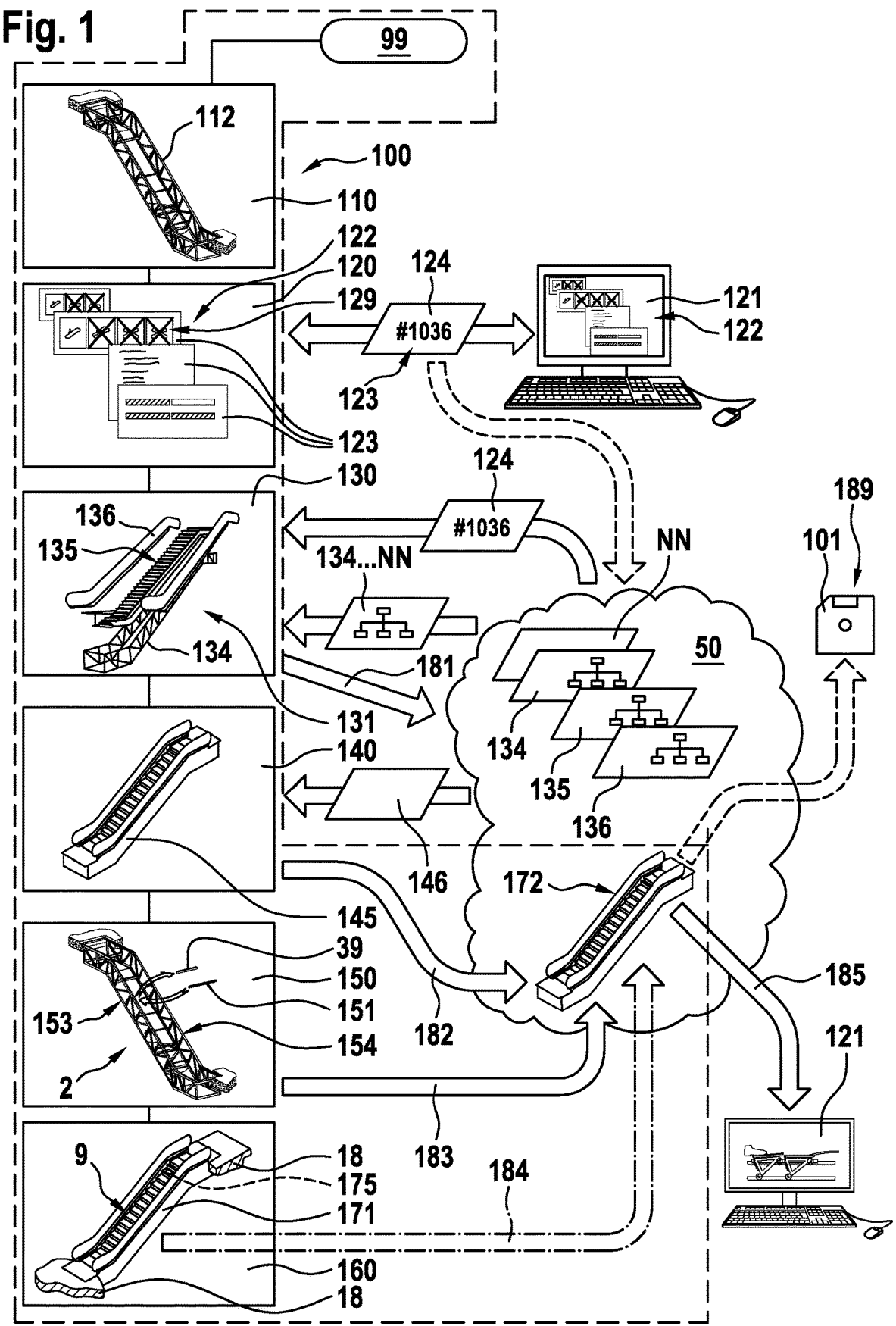
FIG. 1 illustrates the method steps of the modernization method according to the disclosure for an existing passenger transport system and the interactions required for carrying out the process with regard to the data sets accompanying the modernization method.

FIG. 1 is a block diagram to show the some of the substantial method steps 110 to 160 of the modernization method 100 according to the disclosure (marked by a broken line) of an existing passenger transport system 1 (see FIG. 4) as well as the interactions required for carrying out the modernization method 100 with the data sets accompanying the modernization method 100, computer systems 121, and storage media such as a data cloud 50.

The primary method steps of the modernization method 100 are divided into:
  in the first method step 110, the generation of a three-dimensional supporting framework model data set 112 of the existing supporting framework 2 of the existing passenger transport system 1;
  in the second method step 120, a detection of customer-specific configuration data 123;
  in the third method step 130, a creation of a digital double data set 131 from component model data sets 134 . . . NN including the three-dimensional supporting framework model data set 112 of the existing supporting framework 2 and the customer-specific configuration data 123;
  in the fourth method step 140, a conversion of the digital double data set 131 into a commissioning digital double data set 145 by adding production-specific data;
  in the fifth method step 150, the adaptation of the existing supporting framework 2, the production of physical components 151 and their installation in and on the existing supporting framework 2 using the commissioning digital double data set 145 and updating of the commissioning digital double data set 145 for production digital double data set; and,
  in the sixth method step 160, the start-up of the modernized passenger transport system 171 and the updating of the production digital double data set to the updated digital double data set ADDD 172.

All data processing and data storage, as well as the step-by-step creation of the updated digital double data set 172, can take place, for example, via the data cloud 50.

The starting position 99 for carrying out the modernization method 100 according to the disclosure can be an order for the modernization of a passenger transport system 1 configured as an escalator or moving walkway, which has been installed for years in a shopping center, in an airport building, or in a subway station and performs its service there. Usually, when modernizing escalators and moving walkways, only the most valuable component of the existing passenger transport system 1 is retained, namely its supporting framework 2. This bridge-like structure is arranged between two support points 4 of the corresponding building 18 (see FIG. 2) and not only causes the most costs in its manufacture, but also the highest transport costs and costs for the existing building 18 due to its bulkiness, if, for example, additional openings have to be made in its walls, in order to bring an escalator or a moving walkway completely mounted ex works into the existing building 18.

So that the components 151 to be newly inserted for the purpose of modernization can be built into the existing supporting framework 2, its dimensions must be detected in a first method step 110. For this purpose, a three-dimensional supporting framework model data set 112 of the existing supporting framework 2 is generated. A possible generation of the three-dimensional supporting framework model data set 112 is described in more detail below in connection with FIG. 4.

On the basis of the current and possibly also future deployment profile of the existing passenger transport system 1 and the dimensions of the existing supporting framework 2, the desired, modernized passenger transport system 171 is configured in the second method step 120.

For example, an internet-based configuration program which is permanently or temporarily installed in a computer system 121 can be available for this purpose. Customer-specific configuration data 123 are queried using various input masks 122 and stored in a log file 124 under an identification number. The configuration program can cover a great number of options that the customer can select according to his needs. However, as indicated by means of crossed-out selection fields 129, specific options are excluded by the existing supporting framework 2 during a modernization. This can mean that the configuration program uses specific characterizing properties of the three-dimensional supporting framework model data set 112 created in the first method step 110 in order to control the release of options. Such characterizing properties can include the width of the core space 113 shown in FIG. 2 with a dash-double-dotted line, the spatial positions of the access regions defined by the horizontal portions 117, 118 of the existing supporting framework 2, as well as the length, the spatial position, and the angle of incline of the central part 119, lying between the horizontal portions, of the existing supporting framework 2.

The log file 124 can be stored, for example, in the data cloud 50. The architect of the customer, said architect planning the modernization, can optionally be provided with a digital envelope model using his customer-specific configuration data 123, and he can insert this envelope model into his digital building model for the purpose of visualizing the planned building remodeling. As customer-specific configuration data 123, for example, in addition to the coordinates and dimensions resulting from the three-dimensional supporting framework model data set 112 of the existing supporting framework 2, in particular design features such as the balustrade type, colors, and textures of cladding parts, possibly the desired conveying capacity, etc. are queried.

If the architect is satisfied with the passenger transport system he has configured, he can order the modernization from the manufacturer by specifying the customer-specific configuration data 123, for example, by referring to the identification number or the identification code of the log file 124.

When an order is received, represented by the third method step 130, which is referenced to a log file 124, a digital double data set 131 specifying a target configuration is initially created. When creating the digital double data set 131, component model data sets 134, 135, . . . , NN which are provided for manufacturing the physical components 151 are used. This can mean that for each physical component, a component model data set 134, 135, . . . , NN is stored, for example, in the data cloud 50 and contains all the characterizing properties (dimensions, tolerances, material properties, surface quality, interface features for further component model data sets, etc.) for this component in a target configuration. Some of the available component model data sets 134, 135, . . . , NN do not completely define the component, but must be supplemented or completely defined by the customer-specific configuration data.

Now the component model data sets 134, 135, . . . , NN required to create the digital double data set 131 are selected in an automated manner based on logical links, and their number and arrangement in three-dimensional space are determined by means of the customer-specific configuration data 123. For this purpose, work is preferably not carried out directly with the three-dimensional supporting framework model data set 112 of the existing structural structure 2, but rather a provisional supporting framework model data set 134 is first created. This is designed solely on the basis of the customer-specific configuration data 123, which also contain the information extracted from the three-dimensional supporting framework model data set 112, which is required for the design of the provisional supporting framework model data set 134. The provisional supporting framework model data set 134 is actually not needed, but it is ideally matched to the new components to be modernized or their component model data sets 135, . . . , NN and, as a central component model data set, has most of the interface features to the adjacent component model data sets 135, . . . , NN and the spatial distances between these interface features. The provisional supporting framework model data set 134 can have all relevant characterizing features so that, supplemented by production-specific data, a physical structural structure could also be produced with it. As explained further below, the provisional supporting framework model data set 134 is required to match the three-dimensional supporting framework model data set 112 of the existing supporting framework 2.

Figure 2:
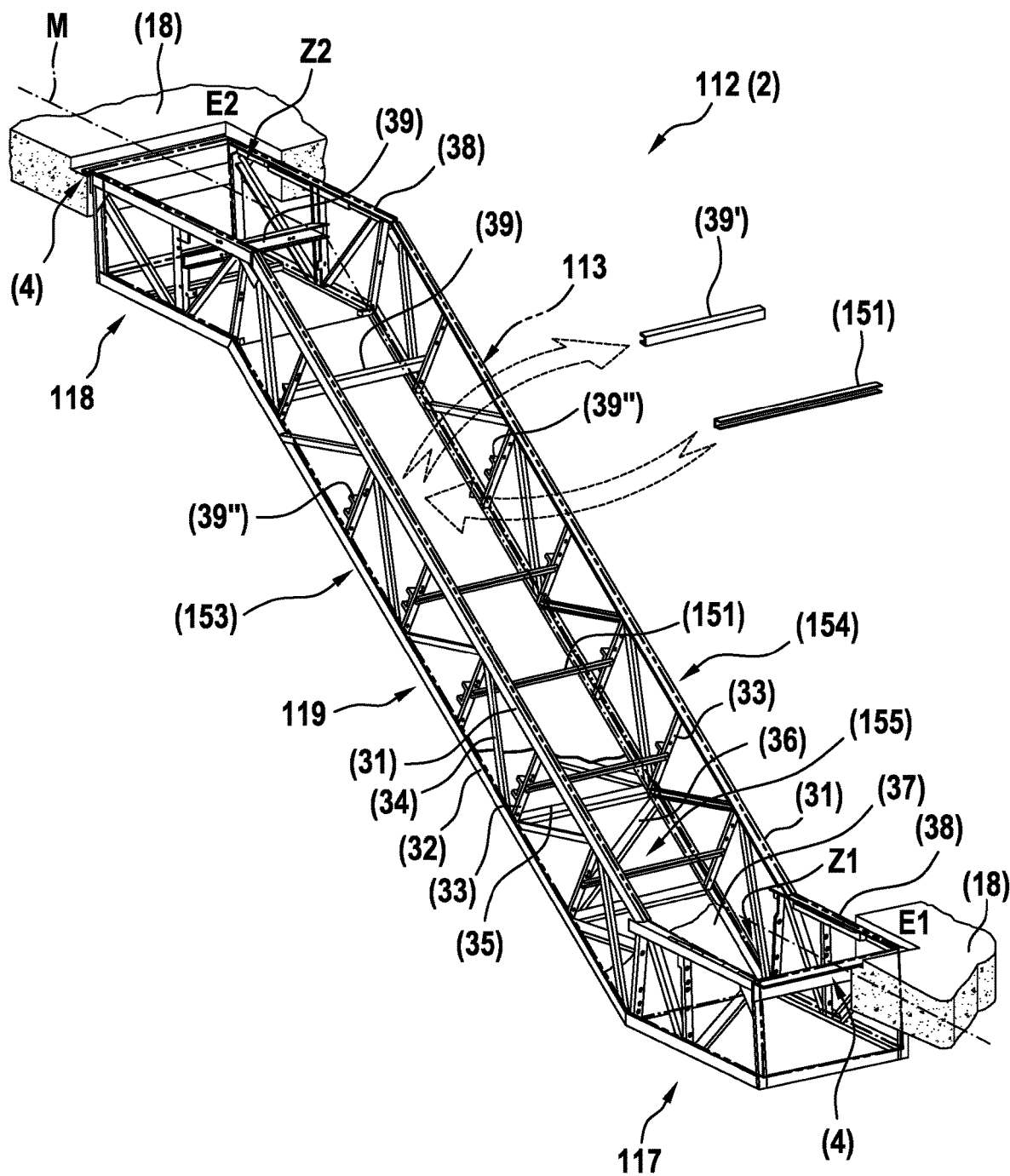
FIG. 2 shows a three-dimensional supporting framework model data set of an existing structural structure designed as a framework of a passenger transport system to be modernized, as well as its core space.

The new components 151 to be inserted for the purpose of modernization or their component model data sets 135, . . . , NN are selected and designed using the customer-specific configuration data 123 and in particular the determined core space 113 described in FIG. 2. Furthermore, the dimensions of the provisional supporting framework model data set 134 are designed in such a way that a component model data set of a conveyor belt 135 that fits into it also fits into the core space 113 of the three-dimensional supporting framework model data set 112 of the existing supporting framework 2. By using a provisional supporting framework model data set 134, logically, any contours of components of the existing supporting framework 2 that protrude into the core space 113 or penetrate it are not taken into account. Taking these contours into account would not only hinder the installation and function of the new components to be inserted, but possibly even make modernization impossible. For this reason, contours of the three-dimensional supporting framework model data set 112 of the existing supporting framework 2 protruding or penetrating into the core space 113 are marked as to be removed (manually or automatically). Their physical counterparts are later removed during the preparation of the existing supporting framework 2 in the fifth method step 150. Examples of such contours are, in particular, cross struts 39 which support the two side structures 153, 154 of the existing supporting framework 2 against one another or frames arranged on the side structures 153, 154 which serve to support and fasten guide rails.

Subsequently, the component model data sets 135, . . . , NN and the provisional supporting framework model data set 134 are combined by means of their interface features to form a corresponding digital double data set 131 of the passenger transport system 171, which was later modernized. In the process, it is obvious that an escalator or moving walkway comprises several thousand individual parts (represented by the reference signs . . . , NN) and consequently just as many component model data sets 134, 135, NN must be used and processed to create a digital double data set 131. The digital double data set 131 has target data for all physical components to be manufactured or procured, these target data representing characterizing properties of the components required to construct the passenger transport system 1 in a target configuration. As illustrated by the arrow 181, the digital double data set 131 can be stored in the data cloud 50.

Finally, in the case of the digital double data set 131, the provisional supporting framework model data set 134 generated from the customer-specific configuration data is replaced by the three-dimensional supporting framework model data set 112 of the existing supporting framework 2. Of course, when replacing, all spatial positions of the remaining component model data sets 135, NN of the digital double data set 131 to one another, or their spatial arrangement to one another, are retained. Likewise, specific spatial position information of the provisional supporting framework model data set 134, such as its central longitudinal axis M (see FIG. 2) and the horizontal planes Z1, Z2 of its access regions above the horizontal portions 117, 118 of the existing supporting structure 2, can be retained in order to align the three-dimensional supporting framework model data set 112 of the existing supporting framework 2 to be inserted. Furthermore, the interface features of the provisional supporting framework model data set 134 must be transmitted to the three-dimensional supporting framework model data set 112 of the existing supporting framework 2 by means of component model data sets of adapter components 191 (see FIG. 3). The component model data sets of adapter components 191 can be generated taking into consideration the interface features of the provisional supporting framework model data set 134 of the digital double data set 131, and the geometric data of the three-dimensional supporting framework model data set 112 of the existing supporting structure 2 while disregarding its marked contours. This is described in more detail below with reference to FIG. 3.

In the fourth method step 140, the commissioning digital double data set 145, which contains all the production data required for producing the passenger transport system 171 to be modernized one day, is created by supplementing the digital, three-dimensional double data set 131 with production-specific data 146. Such production-specific data 146 can include, for example, the production location, the material that can be used at this production location, the production means used to produce the physical component 151, lead times, and the like. As illustrated by arrow 182, this supplementing step is carried out in updated digital double data set 172, which is still being constructed.

According to the fifth method step 150, the commissioning digital double data set 145 can then be used in the production facilities of the manufacturing plant in order to allow the production of the physical components 151 of the passenger transport system 171 to be modernized. Logically, however, no new supporting framework is produced, but rather the existing supporting framework 2 is revised first, as can be seen in the block diagram image. In the process, the contours or components 39 marked in the three-dimensional supporting framework model data set 112 must be removed from the existing structural element 2. Furthermore, the existing supporting framework 2 must be supplemented with the physical adapter components 151 so that it subsequently has all the physical interface features to the components of the modernized passenger transport system 171 to be added, as originally defined by the provisional supporting framework model data set 134.

These revision steps of the existing supporting framework 2 and the further assembly steps for the modernized, physical passenger transport system 171 can be defined in the commissioning digital double data set 145.

During and after the manufacture of the physical components and during the assembly of the resulting modernized passenger transport system 171, at least some of the characterizing properties of components and assembled component groups are detected, for example, using measurement and non-destructive testing methods, and are assigned to the corresponding virtual components or component model data sets 135, NN. In the process, the actual data measured on the physical components replace the assigned target data of the commissioning digital double data set 145 as the characterizing properties. As production progresses, the commissioning digital double data set 145 increasingly becomes the updated digital double data set 172 with this transmission, illustrated by the arrow 183. However, it is still not entirely complete; instead, a so-called production digital double data set is formed first.

After its completion, the modernized, physical passenger transport system 171 can be put into operation as shown in the sixth method step 160. Since operating data arise even during the initial start-up, these data are also transmitted to the production digital double data set and converted to characterizing properties of the component model data sets 135, . . . , NN affected thereby. With this update, illustrated by the dash-dotted arrow 184, the production digital double data set becomes the updated digital double data set 172, and, like the modernized physical passenger transport system 171, reaches full operational readiness. From this point in time, according to arrow 185, the updated digital double data set 172 can be loaded into the computer system 121 at any time and used for detailed analysis of the state of the modernized, physical passenger transport system 171.

The sixth method step 160, however, does not actually form an end to the modernization method 100 according to the disclosure, since the updated digital double data set 172 is updated again and again during its service life. This conclusion does not occur until the end of the service life of the modernized, physical passenger transport system 171, wherein in this case the data of the updated digital double data set 172 can be used for the last time for the process of disposing of the physical components.

As described in detail above and symbolized by the dash-dotted arrow 184, the updated digital double data set 172 is updated continuously and/or periodically throughout the entire service life of the modernized passenger transport system 171 by the transmission of measurement data. These measurement data can be detected both by sensors 175 integrated in the passenger transport system and by an input, for example, by maintenance personnel, and transmitted to the updated digital double data set 172. Of course, the updated digital double data set 172 can be stored together with the program instructions 189 required for working with the updated digital double data set 172 on any computer-readable medium such as a floppy disk or a data cloud 50 as computer program product 101.

FIG. 2 shows a three-dimensional supporting framework model data set 112 of an existing structural structure 2 designed as a framework of a passenger transport system 1 to be modernized, as well as its core space 113 shown with a dash-double-dotted line. Since the three-dimensional supporting framework model data set 112 is an exact, virtual copy of the existing supporting framework 2, the reference signs of physical components are also shown in FIG. 2 for better understanding, but these are indicated in brackets.

As already mentioned in connection with the first method step 110 in FIG. 1, the three-dimensional supporting framework model data set 112 must first be created. There are various options for creating a three-dimensional supporting framework model data set 112 from the existing supporting framework 2. The most complex is a manual measurement of the existing supporting framework 2 after all other existing parts of the existing passenger transport system 1 have been removed. The measurement data can then be transmitted to a 3D CAD system, for example. Another possibility is the use of laser scanners or TOF cameras, which can capture a three-dimensional, virtual copy of the existing supporting framework 2. In the process, however, recordings have to be made from a plurality of positions around the framework 2 and these have to be put together, with recording-related distortions having to be corrected. After processing and assembling the recordings, the resulting three-dimensional copy can be read into a computer system 121 (see FIG. 1) and converted into a three-dimensional supporting framework model data set 112 of the existing supporting framework 2 using known software algorithms (e.g., tracing). Another very efficient method of generating the three-dimensional supporting framework model data set 112 is described in more detail below with reference to FIG. 4.

As soon as a three-dimensional supporting framework model data set 112 of the existing supporting framework 2 has been generated, its core space 113 can be determined.

Supporting frameworks 2 of escalators and moving walkways from all manufacturers can be configured very differently. However, they generally have a U-shaped cross section in relation to their longitudinal extension, in that two side structures 153, 154 are connected to one another by a floor or a bottom structure 155. In other words, the existing supporting framework 2 or its three-dimensional supporting framework model data set 112 has two side structures 153, 154 that are connected to one another by means of a bottom structure 155. In the present embodiment in FIG. 2, the two side structures 153, 154 consist of lattice-like structures which are each formed from upper chords 31, lower chords 32, uprights 33 connecting them, and diagonal struts 34. The bottom structure 155 connecting the two side structures 153, 154 is formed from transverse bars 35 and diagonal bars 36, which are covered by a bottom panel 37.

In order to show the installation position, the support points 4 are also shown in two planes E1, E2 of the building 18, on which the two ends of the existing supporting framework 2 rest. The upper chord portions 38 arranged in the horizontal portions 117, 118 of the existing supporting frameworks 2 are by definition arranged with their upper edges in the two planes of the access regions Z1, Z2. This can mean that when replacing the provisional supporting framework model data set 134 in the digital double data set 131 with the three-dimensional supporting framework model data set 112, the upper edges of its horizontal upper chord portions must be arranged in the same planes of the access regions Z1, Z2 as the upper edges of the horizontal upper chord portions of the provisional supporting framework model data set 134. The central longitudinal axis M of the three-dimensional supporting framework model data set 112 is aligned with the central longitudinal axis M of the provisional supporting framework model data set 134 transversely to the longitudinal extent.

The above-mentioned core space 113 is defined by the insides of the side structures 153, 154 and the bottom structure 155 and is usually open towards the top due to the installation position of the existing supporting framework 2. According to generic embodiments, different contours can protrude into the core space 112 or even protrude through it. The "old" components or components that existed before the modernization method 100 was carried out, such as a driving engine frame or guide rails of the existing passenger transport system 1, are fastened to these. Since these contours, as mentioned in connection with FIG. 1, are no longer needed, they can be marked as to be removed. The marked contours are, as shown on the basis of the existing cross struts 39, removed both in the three-dimensional double data set 112 and in the existing supporting framework 2 and, if necessary, replaced by a suitably constructed adapter component. In the present embodiment in FIG. 2, provision is made to saw through the existing cross struts 39 at the boundaries of the core space 113, so that a remnant 39" remains on the upright 33 and only the contour 39' of the existing cross strut 39 penetrating the core space 113 is removed. A new cross strut 151 adapted to the newly inserted component model data sets 135, . . . , NN or new physical components to be built in can then be fastened to the uprights 33 at a suitable position specified by the digital double data set 131 as an adapter component.

Figure 3:
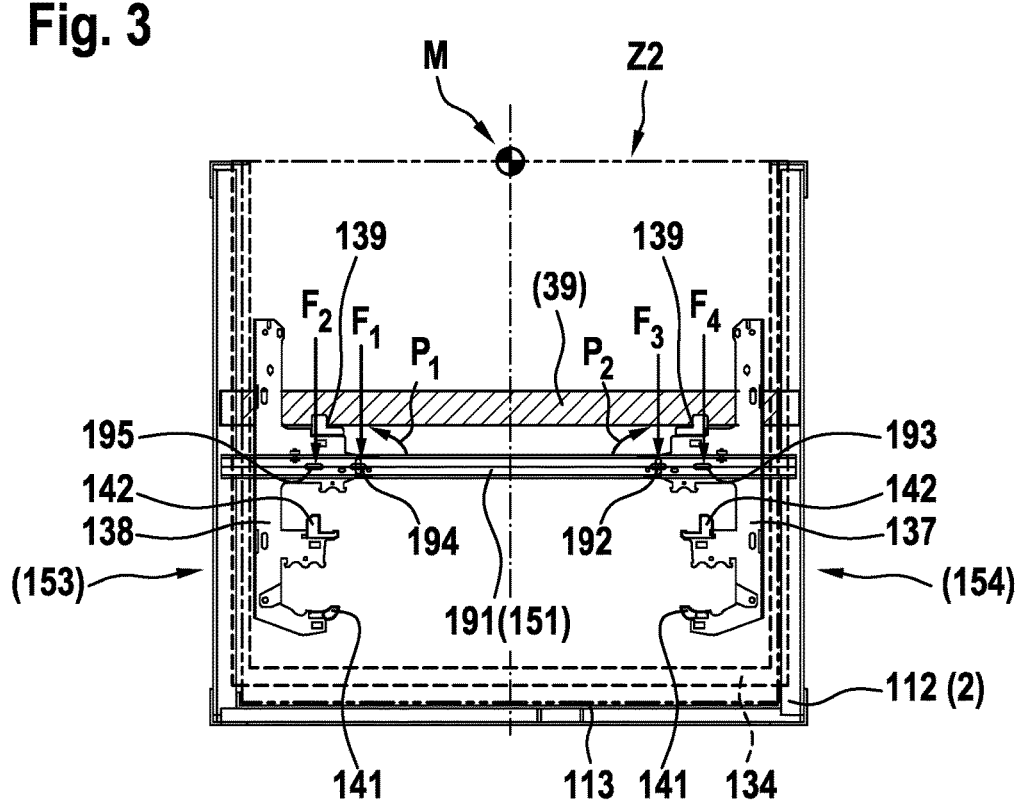
FIG. 3 shows a cross section of the three-dimensional supporting framework model data set shown in FIG. 2, as well as the indicated cross section of a provisional supporting framework model data set, a component model data set of an adapter component, and component model data sets of new components to be inserted.

FIG. 3 also shows this process on the basis of a cross section of the three-dimensional supporting framework model data set 112 shown in FIG. 2, which is arranged orthogonally to the plane of the access region Z2 and the central longitudinal axis M. The new component model data sets to be inserted in this cross section are those of frames 137, 138 and guide rails 139, 141, 142. It can be clearly seen that the new guide rails 139 are passed through exactly where the existing cross strut 39 is arranged in the existing supporting framework 2. Correspondingly, in the three-dimensional supporting framework model data set 112, the contour thereof was marked, shown by way of example by means of hatching. The positioning of the new frames 137, 138 and guide rails 139, 141, 142 to be inserted is specified by the provisional supporting framework model data set 134 shown by broken lines, which is aligned on the one hand at the plane of the access region Z2 and on the other hand on the central longitudinal axis M of the three-dimensional supporting framework model data set 112.

This thus has the interface features 192, 193, 194, 195 stored as spatial coordinates for the component model data sets of the frames 137, 138. The generation of the component model data set of the adapter component 191 designed as a new cross strut 151 to be inserted can take place manually by a technician, but also automatically by means of a set of rules. This can contain an algorithm that selects geometric data of contours of the three-dimensional supporting framework model data set 112 of the existing structural framework 2, which are arranged near the selected interface features 192, 193, 194, 195 of the adapter component 191, and determines the maximum forces F1, F2, F3, F4 and torques P1, P2 acting on the selected interface features 192, 193, 194, 195. In the process, a maximum approach is preferably selected, e.g., the maximum expected forces F1, F2, F3, F4 and torques P1, P2 that can be retrieved from the digital double data set 131 and stored as characterizing properties in the individual component model data sets 134, . . . , NN are used as the basis for calculation.

In order to achieve a function-driven design of the adapter component 191, the component model data set of the adapter component 191 can be generated using the selected geometric data, the geometric data of the component model data sets 112, 137, 138, which have the selected interface features, and the forces acting on these interface features. In the present embodiment, these are the interface features 192, 193, 194, 195 to the frames 137, 138 and the forces F1, F2, F3, F4 and moments P1, P2 acting on these interface features 192, 193, 194, 195. In the process, the selected, geometric data of the component model data sets of the frames 137, 138, and the three-dimensional supporting framework model data set 112 to be connected to one another predetermine specific expansion limits of the adapter component 191 to be generated. The component model data set of the adapter component 191 is preferably generated taking into consideration optimization criteria to be selected by means of an optimization algorithm. This can contain, for example, specifications that the adapter component 119 must also fulfill other functions such as the mutual support of the side structures 153, 154 and/or should have a design that is as material-saving as possible based on the known Monte Carlo simulation.

In the present embodiment, the generated component model data set of the adapter component 191 is a new cross strut 151, which connects the component model data sets of the frames 137, 138 to the three-dimensional supporting framework model data set 112. As can be clearly seen, due to the optimization algorithm used and the forces F1, F2, F3, F4 and torques P1, P2 calculated on the interface features 192, 193, 194, 195, the new, physical cross strut 151 is significantly slimmer than the cross strut 39 marked for removal.

Figure 4:
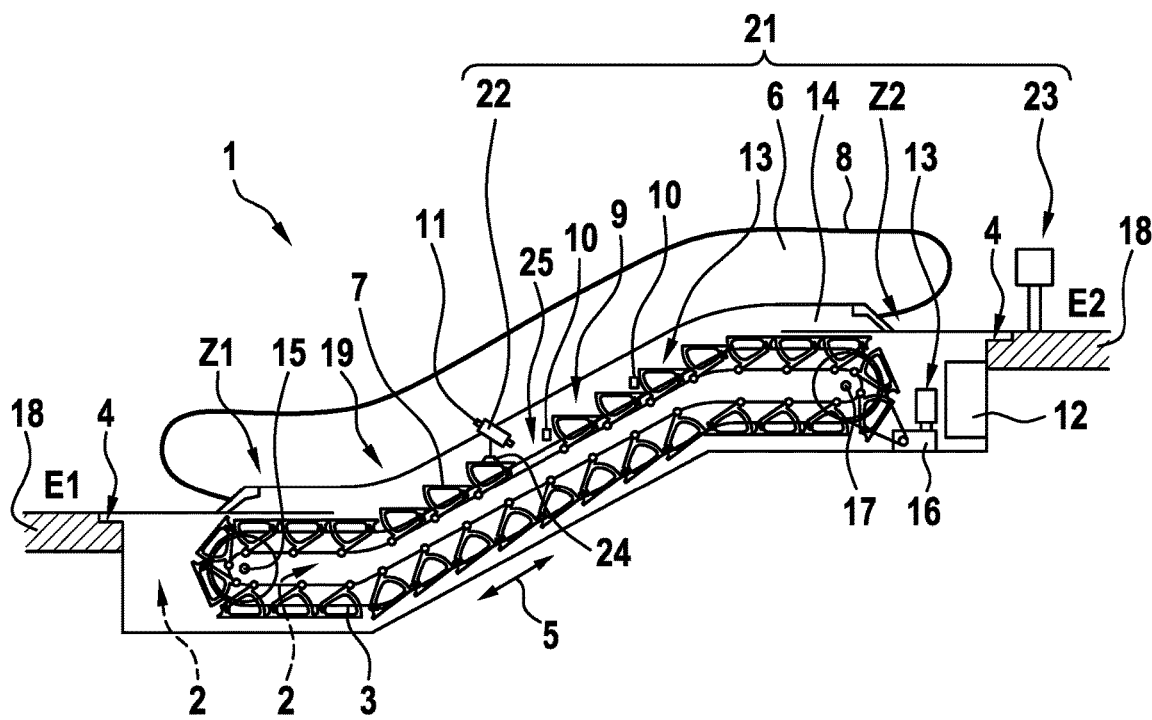
FIG. 4 shows a possible detection of image recordings for generating the three-dimensional supporting framework model data set shown in FIG. 2.

FIG. 4 shows a possible detection of image recordings for generating the three-dimensional supporting framework model data set 112 shown in FIGS. 1 to 3. A side view shows the existing passenger transport system 1 to be modernized, with the aid of which passengers can be transported between two levels E1, E2, for example.

The existing supporting framework 2 is the central component of the passenger transport system 1 and accommodates the other components of the passenger transport system 1 in order to fix them via support points 4 within a building 18 and to transmit their weight to the building 18. The existing supporting framework 2 and its structural components shown in FIG. 2 are only indicated in FIG. 1 with regard to their positions with dashed arrows, but are omitted in detail in order not to impair the clarity of FIG. 1.

The existing passenger transport system 1 to be modernized has two ring-shaped closed conveyor chains 3. The two conveyor chains 3 consist of a multiplicity of chain links. The two conveyor chains 3 can be moved in travel directions along a travel path 5. The conveyor chains 3 run parallel to one another over wide regions and are spaced apart from one another in a direction transverse to the travel direction. In the access regions Z1, Z2 adjacent to the planes de E1, E2 of the building 18, the conveyor chains 3 are deflected by deflection wheels 15, 17.

A plurality of step units 7 in the form of treads extend between the two conveyor chains 3. Each step unit 7 is fastened to one of the conveyor chains 3 near its lateral ends and can thus be moved in the directions of travel along the travel path 5 with the aid of the conveyor chains 3. The step units 7 guided on the conveyor chains 3 form a conveyor belt 9, in which the step units 7 are arranged one behind the other along the travel path 5 and can be stepped on by passengers in at least one conveying region 19. In order to be able to move the conveyor chains 3, the passenger transport system 1 has a driving engine 16 and a control unit 12 which controls this (which are only indicated very schematically in FIG. 4). The conveyor belt 9, together with the driving engine 16 and the deflection wheels 15, 17, forms a conveying device 13, the step units 9 of which can be displaced relative to the existing supporting framework 2, which is fixedly anchored in the building 18.

The passenger transport system 1 also has two balustrades 6 (only one visible) and handrails 8 arranged on them, the latter generally being driven together with the conveyor chains 3 and thus moving synchronously with the conveyor belt 9.

After a period of operation, an existing passenger transport system 1 can be modernized in order to bring it up to date with the latest technical standards. In the process, the remaining components of the existing supporting framework 2 must be precisely measured, for example, with the method described in this case using a detection apparatus 21. The detection apparatus 21 is designed to generate a three-dimensional supporting framework model data set 112 of the existing supporting framework 2, which can then be used as shown in FIGS. 1 to 3.

The detection apparatus 21 shown schematically in FIG. 4 has an image recording device 22. The image recording device 22 is fixed on the conveying device 13 with the aid of a fixing device 24. The detection apparatus 21 is also equipped with a computing device 23.

As part of a modernization process, personnel can remove one or a few of the step units 7 on the passenger transport system 1 to be modernized in advance. For this purpose, the staff does not generally need any special specialist knowledge, so that this activity can also be carried out by auxiliary staff, for example. If necessary, other covers such as cladding sheets of a balustrade base 14 can also be removed. By removing a step unit 7, an opening in the conveyor belt 9 is uncovered and thus a visual access 25 to parts of the supporting framework 2 below is opened.

The image recording device 22 is then fixed on the conveying device 13 with the aid of its fixing device 24. Initially, the image recording device 22 can be arranged, for example, near one end of the conveying region 19, for example, in the vicinity of the access region Z1 on the lower plane E1.

In the example shown, the fixing device 24 is configured in the form of a foot which, on the one hand, is configured to carry the image recording device 22 and, on the other hand, is designed to be fastened to one of the step units 7. The fixing device 24 can, for example, engage in grooves within the step unit 7.

Alternatively, the fixing device 24 could also be designed to interact with other components of the conveyor belt 9, for example, a conveyor chain 3 or axes attached to it, instead of with one of the step units 7. It can also be attached to the circumferentially arranged handrails 8 or to the handrail straps.

As soon as the visual access 25 is created by removing the step units 7 and the image recording device 22 is fastened to the conveying device 13, the image recording device 22 can be successively displaced along the travel path 5 within the conveying region 19. A viewing region of the image recording device 22 can be directed through the visual access 25 onto structural components of the existing supporting framework 2 lying thereunder and record images thereof.

The image recording device 22 can preferably be configured to record three-dimensional images of the existing supporting framework 2 within its viewing region. For this purpose, the image recording device 22 can be designed, for example, as a 3D laser scanner or as a TOF camera.

In order to be able to record images along the entire supporting framework 2 as well possible, the image recording device 22 fixed on the conveying device 13 can be moved together with the conveyor belt 9 successively along the travel path 5 within the conveying region 19 and thereby record a plurality of images from different positions.

Data or signals associated with the image recordings can then be transmitted to the computing device 23. The computing device 23 can be provided directly on the image recording device 22 or even integrated into it. In this case, the three-dimensional double data set 112 shown in FIG. 2 can be generated directly in the image recording device 22 equipped with the computing device 23. Subsequently, the three-dimensional double data set 112 can optionally be transmitted to a control center or a data cloud 50 (see FIG. 1) for further processing.

Alternatively, as shown by way of example in FIG. 4, computing device 23 can be provided as a separate unit. Such a separate computing device 23 can for example, be arranged in the vicinity of the existing passenger transport system 1 and communicate with the image recording device 22, for example, via a wireless data connection. Alternatively, the computing device 23 can also be arranged further away, for example, in a control center which is located outside the building 18 or even in another city. In this case, data and signals from the image recording device 22 can be transmitted to the computing device 23, for example, via a wired or wireless network.

From the image recording data received from the image recording device 22 within the computing device 23, a three-dimensional supporting framework model data set 112 of the structure of the existing supporting framework 2 recorded by the image recording device 22 can be generated. With this three-dimensional supporting framework model data set 112, all dimensions of the existing supporting framework 2 or its surfaces and edges as well as their position and orientation relative to one another are detected and available.

In order to be able to simplify or specify the recording of the image recordings and the generation of the three-dimensional supporting framework model data set 112 based on a plurality of recorded image recordings, a plurality of clearly identifiable reference marks 10 can preferably be arranged along the travel path 5 in the conveying region 19 before the recording process. The reference marks 10 can be provided, for example, as stickers with a code that can be clearly assigned, for example, to a barcode or QR code.

The reference marks 10 can be arranged in such a way that they are within the field of view of the image recording device 22, at least when this is arranged at specific recording positions. The recording positions can be selected such that at least one reference mark 10, preferably at least two reference marks 10, are recorded in each image recording.

Based on the recorded reference marks 10, an overall image or the three-dimensional supporting framework model data set 112 can subsequently be generated more easily from the individual image recordings and/or this can be calibrated and/or any distortions caused, for example, by recording errors, can be calculated out.

If necessary, the image recording device 22 can also be configured to communicate with the control unit 12 of the passenger transport system 1 with the aid of a signal exchange device 11. For example, the control unit 12 can always be made to stop the driving engine 16 when the image recording device 22 has reached specific positions, so that the image recording device 22 can record images without blurring at these positions, the conveyor belt 9 being stationary. Furthermore, the image recording device 22 can cause the control unit 12 to stop the operation of the driving engine 16 as soon as the image recording device 22 has completely passed through the conveying region 19 and is approaching its opposite end, for example.

Figure 5:
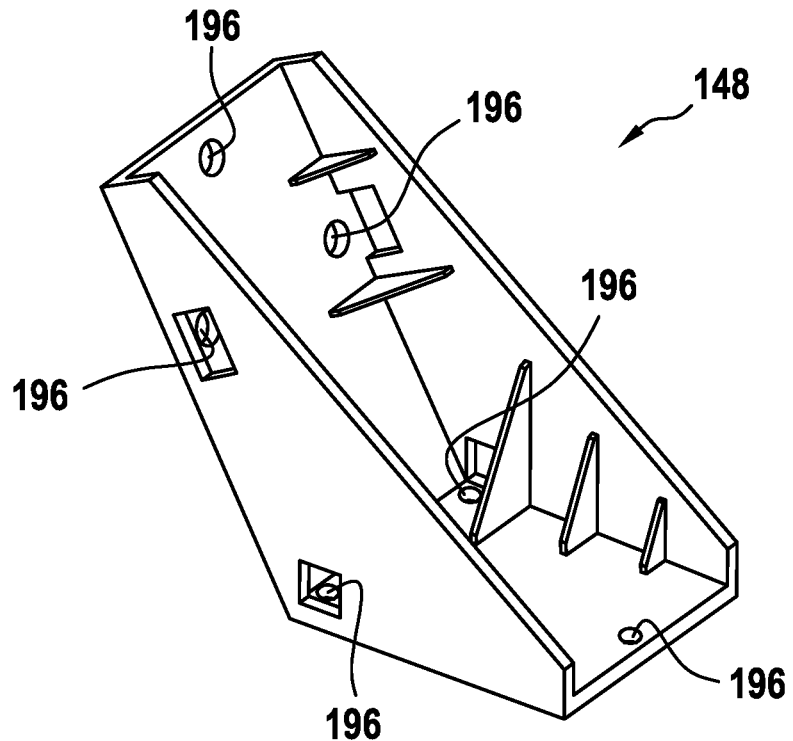
FIG. 5 is a three-dimensional view of an adapter component as it would be constructed by hand.

FIG. 5 shows a three-dimensional view of a component model data set of an adapter component 148, as it would, for example, be constructed manually using a conventional CAD program on the basis of the installation conditions determined. This serves, for example, to connect the three-dimensional supporting framework model data set 112 shown in FIG. 2 with a new component model data set, not shown in detail, of a driving engine carrier of the modernized passenger transport system 171. On the component model data set of the adapter component 148, screw holes 196 are defined as interface features, so that the physical machine carrier can then be connected to the existing supporting framework 2 by means of its physical component.

Figure 6:
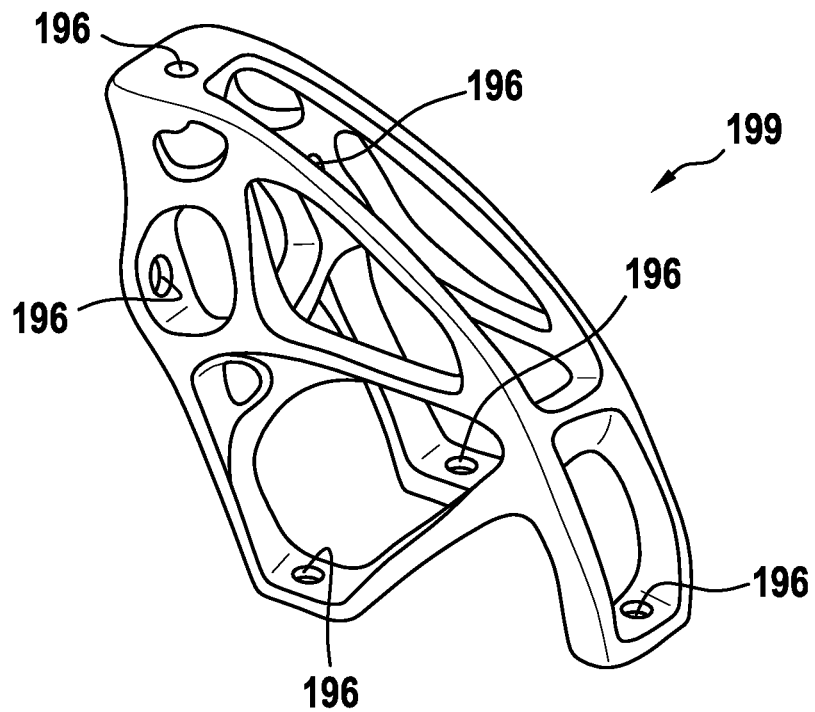
FIG. 6 is a three-dimensional view of an adapter component with the same interface features as the adapter component of FIG. 5, but with a generative, function-driven design.

FIG. 6 shows a three-dimensional view of a component model data set of an adapter component 199 with the same interface features 196 as the component model data set of the adapter component 148 of FIG. 5, but with a generative, function-driven design.

In other words, the component model data sets of adapter components 199 can be configured in a topology-optimized manner based on their function, their installation conditions, as well as forces and loads acting on them and subsequently also produced for the respective, subsequently modernized passenger transport system 171. This results in considerable advantages for the consumption of resources, since only the absolutely necessary amount of material is used (e.g., steel, aluminum) or new, resource-saving production techniques can be used, whereby the $CO^2$ footprint of the modernized passenger transport system 171 decreases even further, since by maintaining the existing supporting framework 2 and by adapting it with adapter components 199 to save resources, less material has to be recycled in a costly manner.

Since the success of a modernization of an existing passenger transport system 1 always includes a time-critical component, at least one component model data set of an adapter component 199 provided with production-specific data can be transmitted to a 3D printing machine, and a physical adapter component can be generated by means of this component model data set 199. This can mean that these very special individual items can be produced in a resource-saving manner and are available "overnight," so to speak.

Although FIG. 1 through 6 relate to different aspects of the present disclosure and these have been described in detail using the example of a passenger transport system 1 configured as an escalator, it is obvious that the described method steps and a corresponding apparatus may be used in the same way for moving walkways, as well. Finally, it should be noted that terms such as "having," "comprising," etc. do not preclude other elements or steps, and terms such as "a" or "an" do not preclude a plurality of elements or steps. Furthermore, it should be noted that features or steps that have been described with reference to one of the above embodiments can also be used in combination with other features or steps of other embodiments described above. Reference signs in the claims are not to be interpreted as delimiting.

The invention claimed is:

1. A method for modernizing an existing passenger transport system that is configured as an escalator or a moving walkway and which comprises a circulating conveyor belt, the method comprising:
   generating, from an existing supporting framework of the existing passenger transport system, a three-dimensional supporting framework model data set;
   determining, on the basis of the three-dimensional supporting framework model data set of the existing supporting framework, a core space of the existing supporting framework;
   determining customer-specific configuration data by selecting new components to be installed, wherein new components are selectable only if they can be arranged within the core space;
   creating, using the customer-specific configuration data relating to the selection of new components and component model data sets that digitally represent the selected new components, a digital double data set specifying a target configuration comprising a provisionally modernized passenger transport system including a provisional supporting framework model data set, wherein the target configuration comprises characterizing properties for the provisionally modernized passenger transport system;
   marking contours of components of the three-dimensional supporting framework model data set of the existing supporting framework protruding or penetrating into the core space as to be removed; and
   adapting the three-dimensional supporting framework model data set of the existing supporting framework based on the provisional supporting framework data set of the digital double data set by generating component model data sets of adapter components based on interface features of the provisional supporting framework model data set and the geometric data of the three-dimensional supporting framework model data set of the existing supporting framework while disregarding its marked contours, wherein the adapter components comprise adapter plates or adapter modules.

2. The method of claim 1, wherein the existing supporting framework or its three-dimensional supporting framework model data set has two side structures which are connected to one another using a bottom structure and thereby, with regard to its longitudinal extent, comprises a U-shaped cross section, wherein the core space is delimited by the insides of the side structures and the bottom structure.

3. The method of claim 1, wherein generating the three-dimensional supporting framework model data set of the existing structural framework comprises:
   fixing an image recording device to the existing, circulating conveyor belt;
   removing at least one step unit of the circulating conveyor belt in order to open up visual access to the underlying regions of the existing supporting framework;
   before recording image recordings, attaching at least one reference mark which is clearly recognizable for the image recording device to the existing passenger transport system in a stationary manner at at least one point within a travel path;
   displacing the conveyor belt together with the image recording device fixed thereon circumferentially at least over sub-regions of the travel path;
   recording image recordings of the structural components of the existing supporting framework to be measured using the image recording device from a plurality of positions along the travel path; and
   wherein the generation of the three-dimensional supporting framework model data set takes place at least from sub-regions of the structural components of the existing supporting framework, based on the recorded image recordings and with the aid of the at least one reference mark recorded together.

4. The method of claim 3, further comprising, when generating the three-dimensional supporting framework model data set, combining a plurality of image recordings are combined to form an overall recording, considering the reference marks recorded together in the image recordings.

5. The method of claim 3, further comprising, when generating the three-dimensional supporting framework model data set, correcting distortions in the image recordings are corrected based on the reference marks recorded together in the image recordings.

6. The method of claim 3, further comprising calibrating the generated three-dimensional supporting framework model data set based on the reference marks recorded together in the image recordings.

7. The method of claim 3, further comprising recording the image recordings during the continuous displacement of the existing conveyor belt.

8. The method of claim 1, further comprising removing the provisional supporting framework model data set generated from the customer-specific configuration data from the digital double data set, and inserting into the three-dimensional supporting framework model data set of the existing supporting framework and the component model data sets of the adapter components are inserted.

9. The method of claim 8, further comprising identifying a set of rules for generating the component model data sets of adapter components, wherein, based on the rules:
   for each component model data set of an adapter component, performing a logical selection and grouping of interface features of the component model data sets to be inserted into the digital double data set;
   selecting geometric data of contours of the components of the three-dimensional supporting framework model data set of the existing structural framework, and arranging the components near the selected interface features of the adapter component; and
   determining the maximum forces acting on the selected interface features.

10. The method of claim 9, further comprising, based on the selected geometric data of the three-dimensional supporting framework model data set, the geometric data of the component model data sets having the selected interface features, the forces acting on the interface features, and optimization criteria selected for optimizing multiple objectives, generating the component model data set of the adapter component.

11. The method of claim 10, further comprising transmitting, at least one component model data set of the adapter component provided with production-specific data to a 3D printing machine and producing a physical adapter component based on the component model data set.

12. The method of claim 1, further comprising supplementing digital double data set with production-specific data and this creating a commissioning digital double data set from the digital double data set, wherein the commissioning digital double data set comprises target data which reproduce characterizing features of components of the subsequently modernized passenger transport system as the target configuration.

13. The method of claim 12, further comprising creating an updated digital double data set comprising:
creating a production digital double data set based on the commissioning digital double data set by measuring actual data which reproduce characterizing features of components of a fully modernized passenger transport system after the assembly, and replacing target data in the commissioning digital double data set with corresponding actual data; and
creating the updated digital double data set by modifying the production digital double data set based on measured values, wherein the updated digital double data set reproduces changes in the characterizing features of components of the fully modernized passenger transport system during the operation.

14. A computer-readable medium comprising machine-readable program instructions which, when executed on a programmable apparatus, cause the programmable apparatus to carry out or control the method of claim 1.

15. The method of claim 1, wherein the characterizing properties comprise one or more of: dimensions, tolerances, material properties, surface quality, and interface features for other component model data sets.

16. The method of claim 1, wherein the interface features define which component model data sets are permissible to be linked to this interface.

17. The method of claim 1 wherein the geometric data comprises one or more of: length, width, height, cross-sectional shape, recesses, protrusions, radii, arc dimensions.

* * * * *

UNITED STATES PATENT AND TRADEMARK OFFICE
CERTIFICATE OF CORRECTION

PATENT NO. : 11,977,364 B2
APPLICATION NO. : 17/250715
DATED : May 7, 2024
INVENTOR(S) : Gilbert Zimmermann et al.

It is certified that error appears in the above-identified patent and that said Letters Patent is hereby corrected as shown below:

In the Specification

In Column 5, Line 66, delete "at" and insert --at at--.

In Column 10, Line 23, delete "$CO^2$" and insert --$CO_2$--.

In Column 24, Line 50, delete "$CO^2$" and insert --$CO_2$--.

In Column 24, Line 64, delete "FIG." and insert --FIGS.--.

In the Claims

In Column 27, Claim 11, Line 4, delete "machine" and insert --machine,--.

In Column 27, Claim 12, Line 8, delete "and this" and insert --and--.

Signed and Sealed this
Third Day of September, 2024

Katherine Kelly Vidal
*Director of the United States Patent and Trademark Office*